United States Patent [19]

Nogues

[11] 4,332,567

[45] Jun. 1, 1982

[54] MATHEMATICAL TEACHING APPARATUS

[76] Inventor: Pastora S. Nogues, c/o A. J. Zeoli, 270 Huntington Ave., Boston, Mass. 02115

[21] Appl. No.: 148,177

[22] Filed: May 8, 1980

[51] Int. Cl.³ .............................................. G09B 19/02
[52] U.S. Cl. .................................. 434/195; 434/208; 434/211
[58] Field of Search ............... 35/31 G, 34, 72, 70, 35/31 B, 31 D; 434/187, 195, 208, 210, 211, 188

[56] References Cited

U.S. PATENT DOCUMENTS

| | | | |
|---|---|---|---|
| 176,735 | 5/1876 | Bradbury | 35/70 |
| 209,385 | 10/1878 | Davis | 35/72 |
| 1,294,126 | 2/1919 | Linay | 35/70 |
| 1,305,724 | 6/1919 | Kennedy | 35/70 |
| 2,899,757 | 8/1959 | Webb | 35/32 |
| 3,208,162 | 9/1965 | Wisdom | 35/72 X |
| 3,229,388 | 1/1966 | Smith | 35/70 |
| 3,414,986 | 12/1968 | Stassen | 35/31 D |
| 4,257,175 | 3/1981 | Wentworth | 434/208 |

FOREIGN PATENT DOCUMENTS

| | | | |
|---|---|---|---|
| 1031507 | 3/1953 | France | 35/34 |
| 919025 | 2/1963 | United Kingdom | 434/195 |

Primary Examiner—William H. Grieb
Attorney, Agent, or Firm—Wolf, Greenfield & Sacks

[57] ABSTRACT

The apparatus is used as a teaching aid for arithmetic, metric and analytical geometry and elementary algebra, and is formed by a cubic block array comprising a plurality of different size blocks arranged in rows and columns. The cubic block array has a base array of ten-by-ten blocks commencing with a one centimeter block and progressing in x and y rows with increasing length blocks (1 cm., 2 cm., 3 cm., etc.), and overlying arrays of the same pattern but progressively increasing in height (1 cm., 2 cm., 3 cm., 4 cm., etc.).

3 Claims, 2 Drawing Figures

U.S. Patent    Jun. 1, 1982    4,332,567
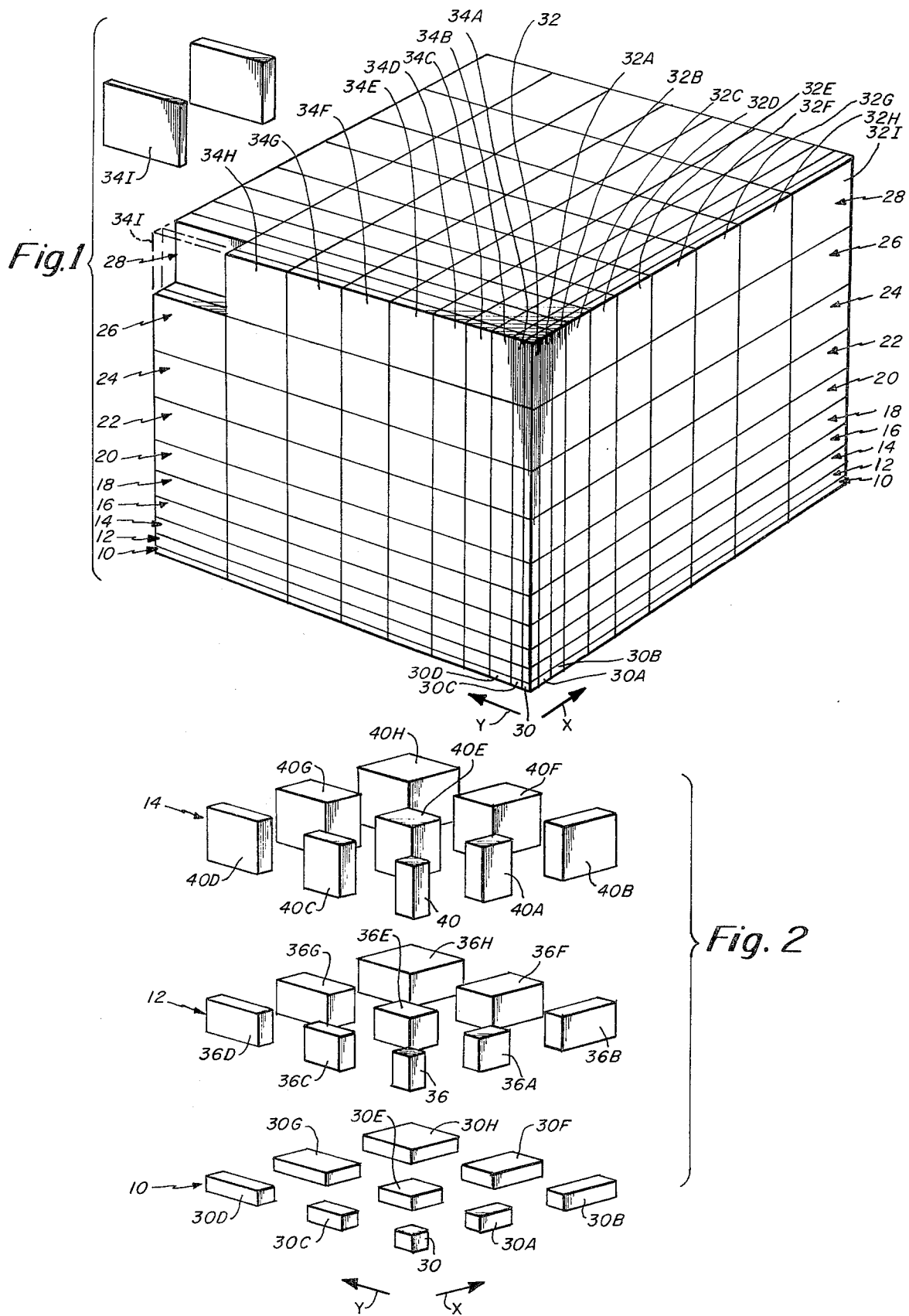

4,332,567

MATHEMATICAL TEACHING APPARATUS

BACKGROUND AND SUMMARY OF THE INVENTION

The present invention relates to a mathematical teaching apparatus. The apparatus of this invention is particularly useful for teaching of such skills as arithmetic, metric and analytical geometry, and elementary algebra.

One of the objects of the present invention is to provide an improved mathematical apparatus employing a plurality of blocks that are adapted to be disposed in a number of different configurations.

Another object of the present invention is to provide mathematical teaching apparatus employing blocks that may be arranged and interpreted for teaching such arithmetic functions as addition, subtraction and multiplication.

Still another object of the present invention is to provide a mathematical teaching apparatus employing blocks and that may be useful in teaching the metric system and metric and analytic geometry.

A further object of the present invention is to provide a mathematical teaching apparatus employing blocks and that may be useful in the teaching of at least elementary algebra.

To accomplish the foregoing and other objects of this invention, there is provided a mathematical teaching apparatus in the form of a plurality of blocks of different size arranged in a plurality of planar arrays, one array overlying the other and each having an increasing height. For example, the base array may have a height of 1 cm., and there may be provided overlying this base array, nine other arrays each of incrementing height. Thus, the second array has a height of 2 cm., the third array, 3 cm., etc. The base array and each overlying array is formed of blocks disposed in an x-y grid commencing from a corner cube block which may be considered of unity dimension such as one cubic cm. In the x and y directions, the blocks progress in length by an integer from the corner cube block. Thus, progressing from this corner block, the blocks in orthogonally opposed directions progress in length to 2 cm., 3 cm., 4 cm., etc. up to a final length of 10 cm. in the enclosed embodiment.

The block arrangement of this invention may be used in a variety of different ways to teach different mathematical techniques and also to teach the metric system.

BRIEF DESCRIPTION OF THE DRAWING

Numerous other objects, features and advantages of the invention should now become apparent upon a reading of the following detailed description taken in conjunction with the accompanying drawing, in which:

FIG. 1 is a perspective view of the block array of the present invention used as a mathematical teaching aid; and FIG. 2 shows a portion of the array in an exploded perspective view for indicating one use of the apparatus of this invention.

DETAILED DESCRIPTION

Referring now to the drawing, there is shown in FIG. 1, one embodiment for the mathematical teaching apparatus in the form of a plurality of blocks which may be constructed of wood, metal or any other suitable material. These blocks may also be color coded in different ways so as to make identification easier.

The block array depicted in FIG. 1 may be further explained by sectioning the array into planar arrays 10, 12, 14, 16, 18, 20, 22, 24, 26 and 28. Each of these arrays are substantially identical with the exception of the height of each array. Thus, the array 10 may be considered as having a unity height such as 1 cm. As far as the plan view of each array is concerned, the plan view of each array is identical to the plan view of the top array 28 depicted in FIG. 1. Thus, each of the planar arrays is a 10 by 10 array with there being a total of 100 blocks per array, and a total of 1,000 blocks in the entire cubic array.

In the embodiment described in FIG. 1, the base array 10 has a height of 1 cm., and each overlying array has an increasing height, with the increase from array to array being also of 1 cm. difference. Thus, the array 12 has a height of 2 cm., the array 14 has a height of 3 cm., the array 16 has a height of 4 cm., the array 18 has a height of 5 cm., the array 20 has a height of 6 cm., the array 22 has a height of 7 cm., the array 24 has a height of 8 cm., the array 26 has a height of 9 cm., and the array 28 has a height of 10 cm. This means a total height of all arrays of 55 cm. Obviously, a different unit of measurement could be used so that the base array has a height of, say, $\frac{1}{4}$ inch. The next highest array would then have a height of $\frac{1}{2}$ inch, $\frac{3}{4}$ inch, 1 inch, etc.

Because all of the arrays are substantially identical as far as a plan view is concerned, for the sake of simplicity, only one of the arrays need be explained in detail. The top array 28 is, thus, substantially identical to the base array 10 except for the difference in height of each of the blocks. Thus, the base array has a block 30 that is a 1 cm. cube. This block is also shown in FIG. 2. The top array 28 has a corresponding block 32 that is 1 cm. square but has a height of 10 cm.

With regard to the array 28, from the corner block 32, the blocks progress in orthogonal x and y directions with increasing length. Thus, the block 32A has a length of 2 cm., the block 32B has a length of 3 cm., the block 32C has a length of 4 cm., the block 32D has a length of 5 cm., the block 32E has a length of 6 cm., the block 32F has a length of 7 cm., the block 32G has a length of 8 cm., the block 32H has a length of 9 cm., and the block 32I has a length of 10 cm. Similarly, progressing in the y direction, the blocks also have similar increasing length increasing by a factor of the unit block. Thus, progressing in the y direction, the blocks progress in length whereby a block 34A has a length of 2 cm., block 32B has a length of 3 cm., block 34C has a length of 4 cm., block 34D has a length of 5 cm., block 34E has a length of 6 cm., block 34F has a length of 7 cm., block 34G has a length of 8 cm., block 34H has a length of 9 cm., and block 34I has a length of 10 cm. Actually, in FIG. 1, block 34I is shown in dotted and the actual block is shown in solid exploded thereabove. Each of the other arrays has the same length requirement with each block progressing in the x and y directions being incremented from the previous block by the unity block dimension. Thus, it is seen that the block 30 of the base array has similar length blocks progressing in x and y directions with the blocks being of successively greater lengths; 2 cm., 3 cm., 4 cm., etc. in length.

The embodiment described in FIG. 1 is a relatively large embodiment, whereas many times in practice a smaller number of blocks are preferred depending upon the level of education of the student. In this regard, FIG. 2 shows a fewer number of blocks. In FIG. 2 like reference characters have been employed where they apply, such as for the unity block 30 which may be considered as being a cube of all 1 cm. dimension.

In addition to the unity or center block 30, in the x direction there are also blocks 30A of 2 cm. length and block 30B of 3 cm. length. Similarly, in the y direction, there are shown blocks 30C and 30D of respective 2 cm. and 3 cm. lengths. The block 30E has a plan dimension of 2 sq. cm. The blocks 30F and 30G are both 2 cm. by 3 cm. while the block 30H is a 3 cm. by 3 cm. block. Just from the base array 10 of FIG. 2, it can be seen that these blocks can be used for teaching simple multiplication. In this regard, each of the blocks may even be identified by a corresponding marking indicating their area or volume. For example, the block 30H may be designated by the number "9" imprinted somehow on the block. A student could readily discover by manipulation of the blocks and maintaining them in the pattern shown in FIG. 2, the product of blocks 30B and 30D which both represent the magnitude "3", is block 30H which represents the magnitude "9."

FIG. 2 also shows portions of the overlying planar arrays 12 and 14. Thus, the overlying array 12 is shown having the center block 36 with the remaining blocks 36A-36H being identical to the blocks 30A-30H except that the height is now 2 cm. for each block rather than 1 cm. Similarly, for the planar array 14, there is provided a center block 40 and additional blocks 40A-40H which are identical in a plan view to the blocks 30A-30H of array 10 except for a difference in height which in the case of array 14 represents a height of 3 cm.

In addition to multiplication, addition and subtraction which may be provided, for example, with a single one of the planar arrays, other mathematical concepts can also be illustrated. For example, cubing can be easily illustrated. For example, if the block 30A represents the quantity "2," then the block 30E represents the square of "2," or the magnitude "4." Similarly, the cube of the magnitude "2" is represented by the block 36E or the array 12 which represents the magnitude "8." The cube of the magnitude "3" is represented by the block 40H which has a corresponding magnitude of "27."

Furthermore, the block construction can also be used in connection with the teaching of simple elementary algebra. As an example, if the block 30 shown in FIG. 2 is to represent the quantity a and the block 30E is to represent the quantity b, then the quantity $(a+b)^2$ is represented by the sum of blocks 30, 30A, 30C and 30E. In other words, the quantity $(a+b)^2 = a^2 + 2ab + b^2$. It can be seen that the blocks 30A and 30C represent the quantity ab and that there are two of these blocks. Therefore, the four blocks together illustrate the algebraic expression $a^2 + 2ab + b^2$. Many other algebraic expressions can also be taught from the block combination.

What is claimed is:

1. Mathematical teaching apparatus formed of a plurality of blocks arranged in a plurality of planar arrays, one overlying the other, and each of different predetermined height with a base array of unity height and each overlying array progressing by a unity increase in height from the base array, said base array formed of blocks in x and y rows commencing from a corner cube block of unity dimension with the x and y block rows progressing in length by an integer from the corner cube block, wherein in the x direction, blocks of the base array are arranged commencing from the corner unity block with integer increases in length 2, 3, 4, etc., in the y direction of the base array are arranged commencing from the corner unity block with integer increases in length 2, 3, 4 etc., and in the z direction of the blocks commencing from the corner unity block increases in integer length 2, 3, 4 etc.

2. Mathematical teaching apparatus as set forth in claim 1 wherein each block is six-sided with the majority of blocks being non cubic.

3. Mathematical teaching apparatus as set forth in claim 1 wherein the x and y rows also have increasing length blocks with each block increasing by unity from the adjacent block.

* * * * *